(12) United States Patent
Martin et al.

(10) Patent No.: US 8,810,812 B2
(45) Date of Patent: Aug. 19, 2014

(54) METHOD AND SYSTEM FOR CONSOLIDATING AND MANAGING RENDERING JOBS

(75) Inventors: Andrew Martin, Honeoye Fallas, NY (US); Brandon S. McComber, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 925 days.

(21) Appl. No.: 12/763,677

(22) Filed: Apr. 20, 2010

(65) Prior Publication Data

US 2011/0255112 A1    Oct. 20, 2011

(51) Int. Cl.
*G06F 3/12* (2006.01)
(52) U.S. Cl.
USPC ............... 358/1.13; 358/1.16; 358/1.14
(58) Field of Classification Search
USPC ................ 358/1, 1.3, 1.15, 1.16–1.18
See application file for complete search history.

(56) References Cited

U.S. PATENT DOCUMENTS

| | | | |
|---|---|---|---|
| 5,920,405 A | 7/1999 | McIntyre et al. | 358/442 |
| 7,233,407 B1 * | 6/2007 | Simchik et al. | 358/1.15 |
| 7,474,428 B2 | 1/2009 | Morris-Jones et al. | 358/1.15 |
| 7,525,676 B2 | 4/2009 | Pesar | 358/1.13 |
| 8,220,061 B2 * | 7/2012 | Fujita et al. | 726/27 |
| 2006/0050291 A1 * | 3/2006 | Morikawa et al. | 358/1.13 |
| 2007/0038313 A1 * | 2/2007 | Bridges et al. | 700/17 |
| 2008/0151293 A1 * | 6/2008 | Narukawa | 358/1.15 |

* cited by examiner

*Primary Examiner* — Mark Zimmerman
*Assistant Examiner* — Lawrence Wills
(74) *Attorney, Agent, or Firm* — Kermit D. Lopez; Luis M. Ortiz; Kevin Soules

(57) ABSTRACT

A system and method for consolidating and managing rendering jobs. A folder can be automatically created based on a system username associated with a user upon receiving a personal rendering job and/or a secure rendering job with respect to a rendering device such as, for example, a printer or MFD. The subsequent rendering jobs that are transmitted from that user to the rendering device can be collected in the folder. An authentication process can be performed if the folder includes the secure rendering job in order to authenticate the user. The authentication process can be automatically skipped and the folder can be directly accessed if the folder does not include the secure rendering job. The authentication process can be optionally bypassed if the folder includes both the personal and the secure rendering jobs.

20 Claims, 7 Drawing Sheets

METHOD AND SYSTEM FOR CONSOLIDATING AND MANAGING RENDERING JOBS

TECHNICAL FIELD

Embodiments are generally related to rendering devices such as, printers, scanners, photocopy machines, and also multifunction devices, which performs multiple rendering functions. Embodiments are also related to secure rendering techniques. Embodiments are additionally related to techniques for consolidating and managing personal and secure rendering jobs.

BACKGROUND OF THE INVENTION

An MFD (Multifunction Device) is an example of a rendering device, which incorporates the functionality of multiple rendering devices in a single apparatus or system, so as to offer a smaller footprint in, for example, a home or small business setting, or to provide centralized document management/distribution/production in the context of, for example, a large-office setting. A typical MFD provides a combination of some or all of the following capabilities: printer, scanner, photocopier, fax machine, e-mail capability, and so forth. Networked MFDs (Multifunction Devices) generally interact with an assemblage of varying client computers, servers, and other components that are connected to and communicate over a network.

MFDs generally support two or more similar types of rendering jobs that are associated with an individual submitter and require interaction at the MFD to release jobs for rendering (e.g., printing, scanning, copying, etc). Other job types such as Proof Print typically require user intervention at the MFD. For example, a secure rendering job transmitted to the MFD requires the submitter to perform an authentication process before the job can be released to prevent unauthorized use and to maintain confidentiality. Personal rendering jobs collected at the MFD do not require such authentication but require the submitter to release them at the MFD. Such rendering jobs are located in different areas of the job status pathway. Conventional techniques for releasing the secure and personal rendering jobs display multiple entries in a job queue and are unable to effectively detect and route the rendering jobs to optimize throughput. Accordingly, initiation of a rendering process is necessarily delayed.

Based on the foregoing, it is believed that a need exists for an improved system and method for consolidating and managing a personal and a secure rendering job, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for configuring a rendering device, such as, for example, a printer or MFD.

It is another aspect of the disclosed embodiments to provide for an improved system and method for consolidating and managing personal and secure rendering jobs.

It is a further aspect of the disclosed embodiments to provide for an improved system and method for creating a folder to collect the personal and secure rendering jobs.

The aforementioned aspects and other objectives and advantages can now be achieved as described herein. A system and method for consolidating and managing one or more rendering jobs with respect to a rendering device is disclosed herein. A folder can be automatically created based on a system username associated with a user upon receiving a personal rendering job and/or a secure rendering job with respect to the rendering. The subsequent rendering jobs that are transmitted to the rendering device can be collected in the folder. An authentication process can be performed if the folder includes the secure rendering job in order to authenticate the user. The authentication process can be automatically skipped and the folder can be directly accessed if the folder does not include the secure rendering job. The authentication process can be optionally bypassed if the folder includes both the personal and the secure rendering jobs.

The list of folders each labeled with the username can be displayed to the user. The personal and the secure rendering jobs can be differentiated visually utilizing dissimilar job icons. The secure rendering job can be provided with an additional lock element having both a locked and an unlocked state. An authentication screen can be provided if the user selects a locked job. The rendering job can be unlocked if the user enters the correct authentication credentials. An option can be provided to the user to render and/or delete the rendering jobs. A notification indicative of successful submission of the rendering job can be also provided and the job can be removed from the folder. Once all the jobs are removed from the folder, the folder can be also removed from the list. A generic job identifier can also be employed in association with the secure rendering job until the user has completed the authentication process. Such an approach provides an appealing and efficient way for the user to manage the personal and secure jobs with respect to the multifunction device.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
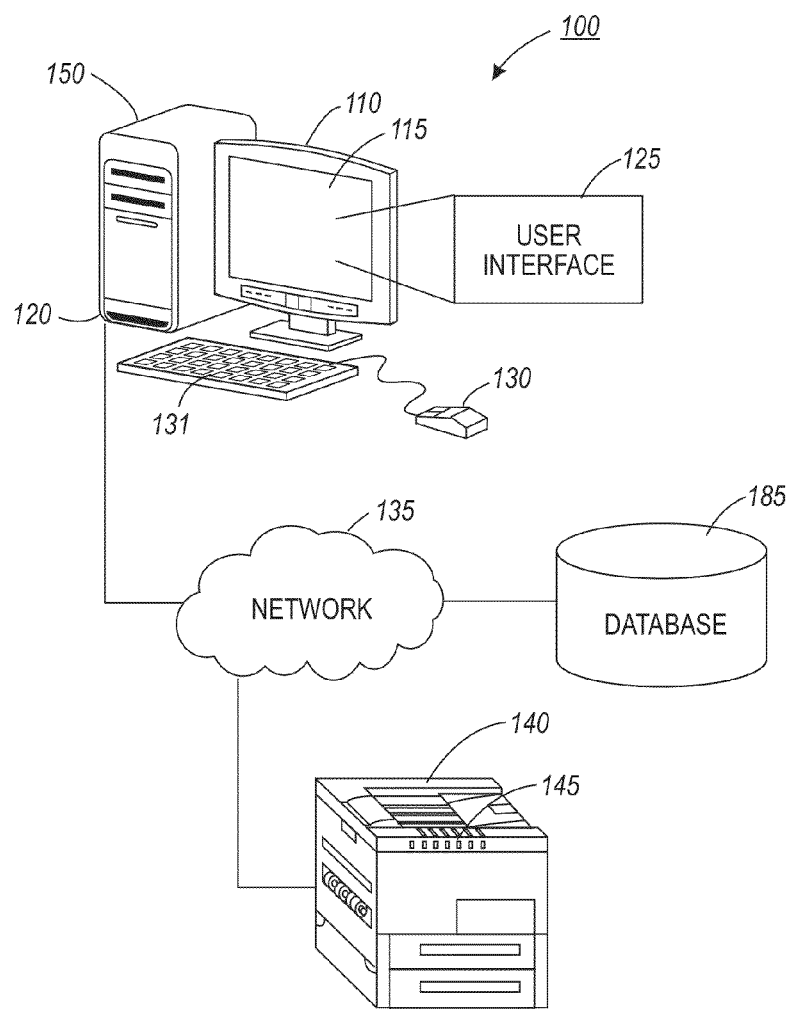
FIG. 1 illustrates a rendering device coupled to a data-processing system through a network, in accordance with the disclosed embodiments.

FIG. 1 is provided as an exemplary diagram of data processing environments in which embodiments of the present invention can be implemented. It should be appreciated that FIG. 1 is only exemplary and is not intended to assert or imply any limitation with regard to the environments in which aspects or embodiments of the present invention can be implemented. Many modifications to the depicted environments can be made without departing from the spirit and scope of the disclosed embodiments.

Referring to FIG. 1, system 100 includes a rendering device 140 coupled to a data-processing system 110 through a network 135. Note that the rendering device 140 may be, some situations, an MFD. In other situations, the rendering device 140 may provide only a single rendering function, such as printing. Thus, the rendering device 140 may be, for example, a LaserJet printer, an inkjet printer, etc or can be an MFD that provides multiple functions such as printing, scanning, faxing, copying, etc. The data-processing system 110 can be, for example, a computing device such as, for example, personal computer, a server, a computer workstation, a laptop computer or another computing apparatus or system (e.g., wireless cellular telephone, Smartphone, etc), and generally includes a central processor 120, a display device 115, a keyboard 131, and a pointing device 130 (e.g., mouse, track ball, pen device, or the like). Additional input/output devices, such as the rendering device 140, may be included in association with the data-processing system 110 as desired.

Note that as utilized herein, the term multifunction device (including the acronym MFD) can refer to an apparatus or system such as a printer, scanner, fax machine, copy machine, etc., and/or a combination thereof. Preferably, rendering device 140 is an MFD capable of multiple functions such as, for example, printing, copying, scanning, faxing, etc. In some embodiments, rendering 140 can be implemented with a single function such as printing. In other embodiments, MFD 140 can be configured to provide multiple functions, such as scanning, faxing, printing and copying. Note that as utilized herein the term "rendering" typically refers to printing a document, but can also refer to other operations such as faxing and scanning.

Figure 4:
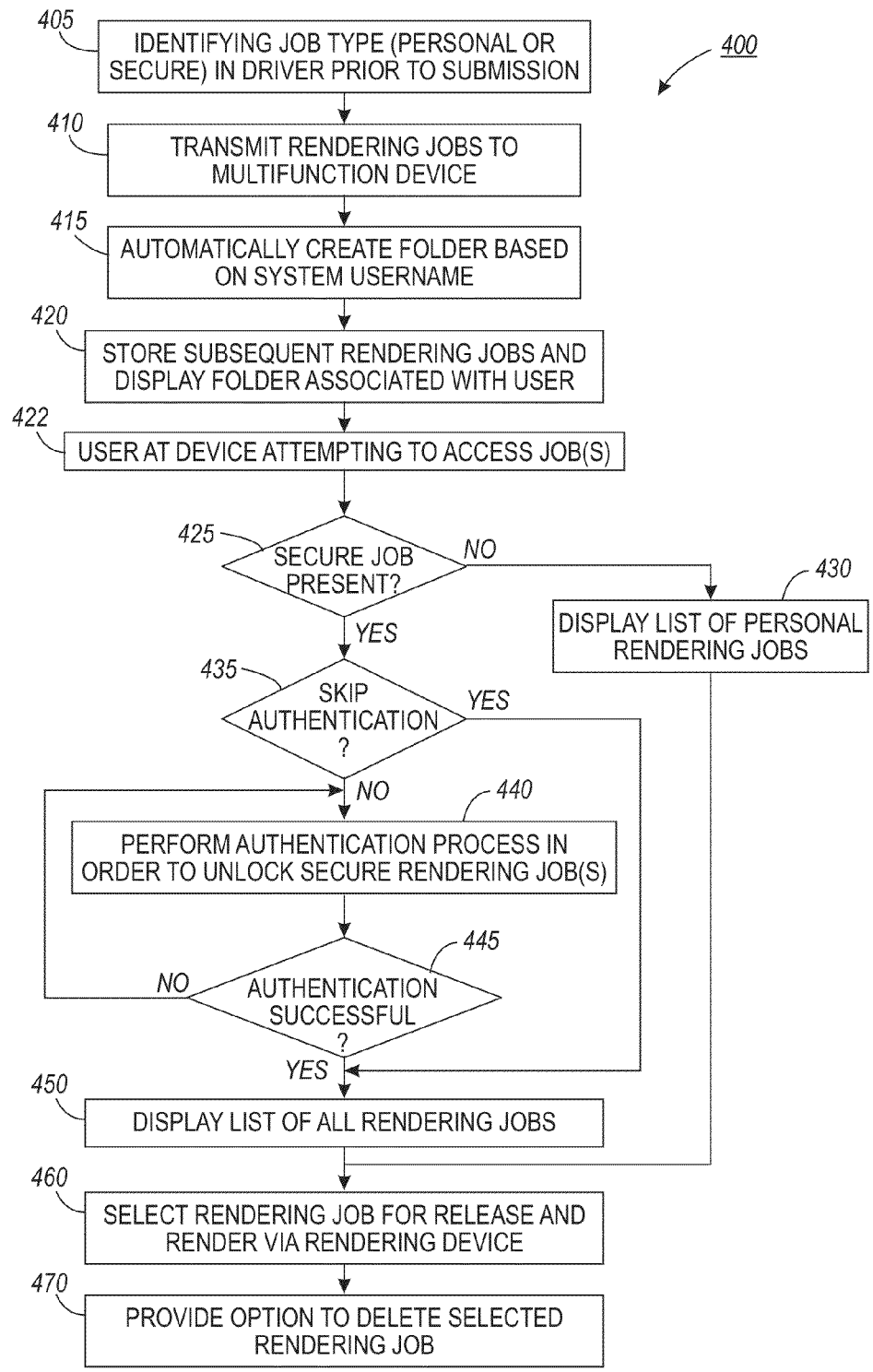
FIG. 4 illustrates a high level flow chart of operation illustrating logical operational steps of a method for consolidating and managing a personal rendering job and a secure rendering job with respect to the rendering device, in accordance with the disclosed embodiments.

A non-limiting example of an MFD that can be utilized as rendering device 140 of FIG. 1 and/or rendering devices 142, 144 shown in FIG. 4 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of an MFD that can be utilized as rendering devices 140, 142 and/or 144 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of an MFD that can be utilized as rendering device 140, 142 and/or 144 is disclosed in U.S. Pat. No. 5,920,405, entitled "Multifunction Device With Printer Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn. Note that such MFDs are referenced herein for generally illustrative purposes and are not considered limiting features of the disclosed embodiments.

The data-processing system 110 can communicate with the rendering devices 140, 142, and/or 144 through, for example, a computer network 135 or other networking configuration. Network 135 may employ any network topology, transmission medium, or network protocol, such as, for example, Ethernet, Internet, Intranet, etc. Network 135 may include connections, such as wired links, wireless communication links, fiber optic cables, USB components, and so forth. The rendering device 140, for example, can be configured to include a user interface 145, such as, for example, a panel menu. The panel menu can be employed to select features and enter other data in the rendering device 140. Such interfaces may include, for example, touch screens having touch activated keys for navigating through an option menu or the like.

A rendering device driver program can be installed at the data-processing system 110 and can reside on a hard drive 150 of host device. The rendering device driver program can be activated through an application interface so that a user may generate a rendering job with the MFD driver for processing by the rendering device 140. The data-processing system 110 also includes a GUI 125 for communicating rendering device features for processing, for example, the rendering job to a user and accepting the user's selection of available device features. The user interface 125 displays information and receives data through device display and/or the keyboard/mouse combination. The interface 125, also serves to display results, whereupon the user may supply additional inputs or terminate a given session. The data-processing system 110 can be, for example, any computing device capable of being integrated within a network, such as a PDA, personal computer, cellular telephone, point-of-sale terminal, server, etc.

Note that the user interface as utilized herein generally refers to a type of environment that represents programs, files, options and so forth by means of graphically displayed icons, menus, and dialog boxes on a screen. The input device of the multifunction device 140 can be a local user interface, such as a touch-screen display or separate keypad and display or a memory fob or the like as discussed above. Alternatively or additionally, the input device can be a wireless port that receives a wireless signal containing constraint data from a portable device. The wireless signal can be an infrared or electromagnetic signal. A system administrator may input constraint data through the local user interface by manipulating the touch screen, keypad, or communicating via wireless messages through the wireless port. The administrator's portable device that communicates wirelessly can be a personal digital assistant (PDA), or the like, as noted above.

The following description is presented with respect to embodiments of the present invention, which can be embodied in the context of the data-processing system 110 and the rendering device 140 depicted in FIG. 1. The present invention, however, is not limited to any particular application or any particular environment. Instead, those skilled in the art will find that the system and methods of the present invention can be advantageously applied to a variety of system and application software, including database management systems, word processors, and the like. Moreover, the present invention can be embodied on a variety of different platforms, including Macintosh, UNIX, LINUX, and the like. Therefore, the description of the exemplary embodiments, which follows, is for purposes of illustration and not considered a limitation.

Figure 2:
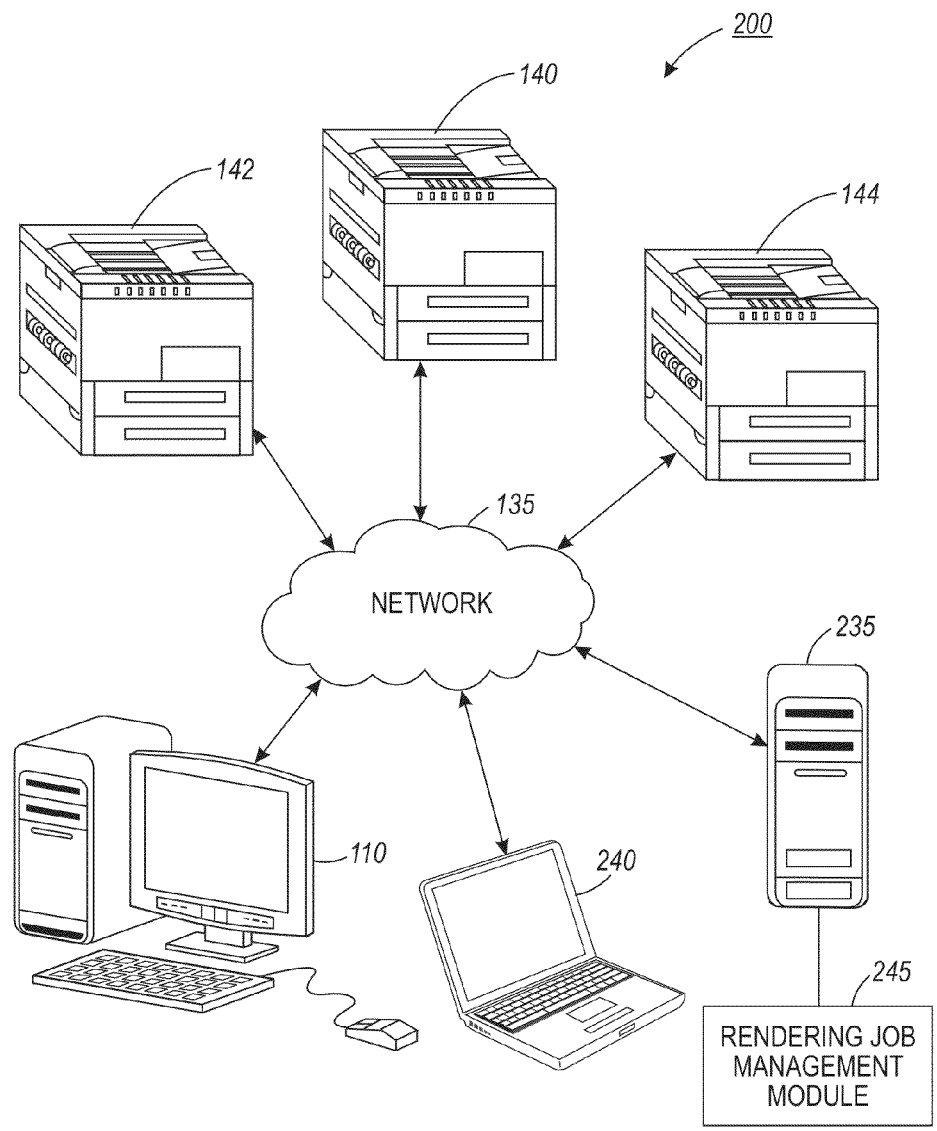
FIG. 2 illustrates a graphical representation of a rendering job management system associated with a network, in accordance with the disclosed embodiments.

FIG. 2 illustrates a graphical representation of a rendering job management system 200 associated with a network 135, in accordance with the disclosed embodiments. Note that in FIGS. 1-9, identical or similar blocks are generally indicated by identical reference numerals. The rendering job management system 200 generally includes one or more rendering devices 140, 142 and 144, data processing system 110, laptops 240 and servers 235. Again, as indicated previously, rendering devices 140, 142, 144 may be single operational devices such as printers or may be for example, devices such as MFDs. Data-processing system 110 depicted in FIG. 1 can be, for example, a server. Other devices such as, for example, desktops, network devices, palmtops, mobile phones, etc may also be included as a part of and/or communicate with the infrastructure of system.

The multifunction rendering devices 140, 142 and 144 can be located remotely with respect to each other, or alternatively, can be located locally with respect to each other. While three rendering devices 140, 142 and 144 are shown by way of example, it is to be appreciated that any number of rendering devices can be linked to the network, such as two, four, six or more rendering devices. In general, the rendering devices 140, 142 and 144 can be employed to perform an output function (e.g., printing, scanning, copying, faxing, etc) within a networked environment.

A rendering job management module 245 running within the network 135 can be adapted to consolidate and manage a rendering job (e.g., see personal job 321, secure job 323 in FIG. 3) with respect to the rendering devices 140, 142 and 144. The job management module 245 can be employed to automatically create a folder with a username associated with the user for collecting the rendering job transmitted to the rendering devices 140, 142 and 144. Note that as utilized herein, the term "module" may refer to a physical hardware component and/or to a software module. In the computer programming arts, such a software "module" can be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module can be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The disclosed embodiments are capable of being distributed as a program product in a variety of forms, which apply equally regardless of the particular type of signal-bearing media utilized to carry out the distribution.

Examples of signal-bearing media can include, for example, recordable-type media, such as Flash drives, USB "Flash" drives, floppy disks, hard disk drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

Figure 3:
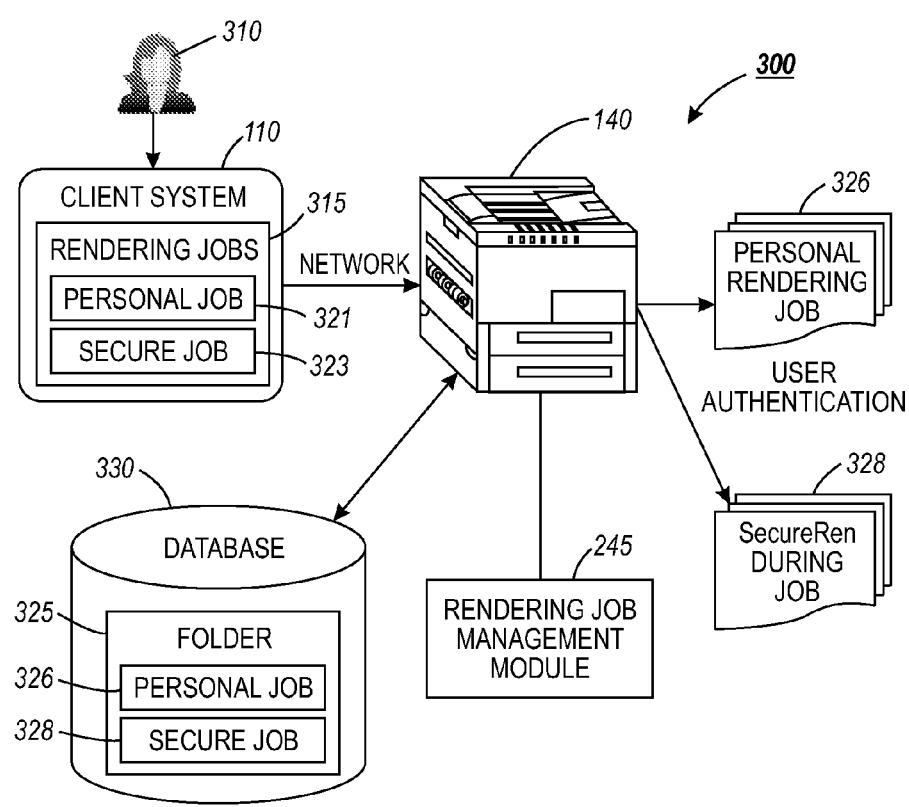
FIG. 3 illustrates a block diagram of the rendering job management system, in accordance with the disclosed embodiments.

FIG. 3 illustrates a block diagram of a rendering job management system 300, in accordance with the disclosed embodiments. As indicated in the configuration of FIG. 2, a user 310 can transmit one or more rendering jobs 315 from the data processing system 110 to the rendering device 140 and/or to other rendering devices such as rendering devices 142, 144, etc. The rendering job 315 may include a personal rendering job 326 and/or a secure rendering job 328. The job management module 245 consolidates and manages the personal and the secure jobs 326 and 328 such that the user can easily locate, manage, and render the jobs 326 and 328. A folder 325 can be created based on the username associated with the data processing system 110 when the user 310 transmits the job 315 to the rendering device 140. Any subsequent personal or secure jobs that are transmitted to the device 140 can be collected in the folder 325. When the user 310 accesses the folder 325 at the rendering device 140 the user 310 can be prompted to log in if the folder 325 includes the secure rendering job 328. The authentication process can be automatically skipped and the folder 325 can be directly accessed if the folder 325 does not include the secure rendering job 328. The authentication process can be optionally bypassed if the folder 325 includes both the personal and the secure rendering jobs 326 and 328.

FIG. 4 illustrates a high level flow chart of operation illustrating logical operational steps of a method 400 for consolidating and managing the personal and secure rendering jobs 326 and 328, in accordance with the disclosed embodiments. As indicated at block 405, a user can identify the job type (Personal or Secure) in, for example, a print driver, prior to submission. The rendering jobs 315 can be then transmitted to a rendering device, such as, for example, the rendering device 140, as illustrated at block 410. A folder 325 can be automatically created based on the user's system username, as indicated at block 415. Any subsequent personal or secure jobs 326 and 328 that are transmitted to the device 140 can be collected in the folder 325 and the folder 325 associated with the user 310 can be displayed, as depicted at block 420. Note that as indicated at block 422, the user is at the device attempting to secure his or her job(s). Thereafter, as illustrated at decision block 425, a test can be performed to determine if the secure job (e.g., secure job 323) is present. If so, then the operation illustrated at block 435 is processed. If not, then the operation illustrated at block 430 is processed, in which a list of personal rendering jobs is displayed via a display screen, such as, for example, the display device 115 depicted in FIG. 1 or via other display screens such as a display screen of an MFD, a rendering device, a mobile communications device (e.g., Smartphone) and so forth. Following processing of the operation depicted at block 430, the operation indicated at block 460 can be processed, in which a rendering job(s) is selected for release and then rendered via, for example, rendering device 140. Thereafter, as indicated at block 470, an option can be provided which when selected permits deletion of the rendering job.

Assuming the answer to the test performed as indicated at decision block 425 is "YES," a test can be performed to determine whether or not to skip an authentication process. If the answer is "YES" then the operation described at block 450 is processed in which a list of all rendering jobs is displayed via a display device. The operations depicted at blocks 460 and 470 can be then processed. Note that if the answer is "NO" with respect to the decision block 435, then the operation illustrated at block 440 can be processed in which an authentication operation/process is performed in order to display one or more secure rendering jobs. Following processing of the operation indicated at block 440, a test can be performed to determine if the authentication was successful, as depicted at decision block 445. If the authentication was not successful then the operation indicated at block 440 can be repeated. If the authentication was successful, then the operations described at blocks 450, 460, and 470 can be processed.

The folder 325 can be created automatically by the system 200 when the first rendering job belonging to the user is received.

Figure 5:
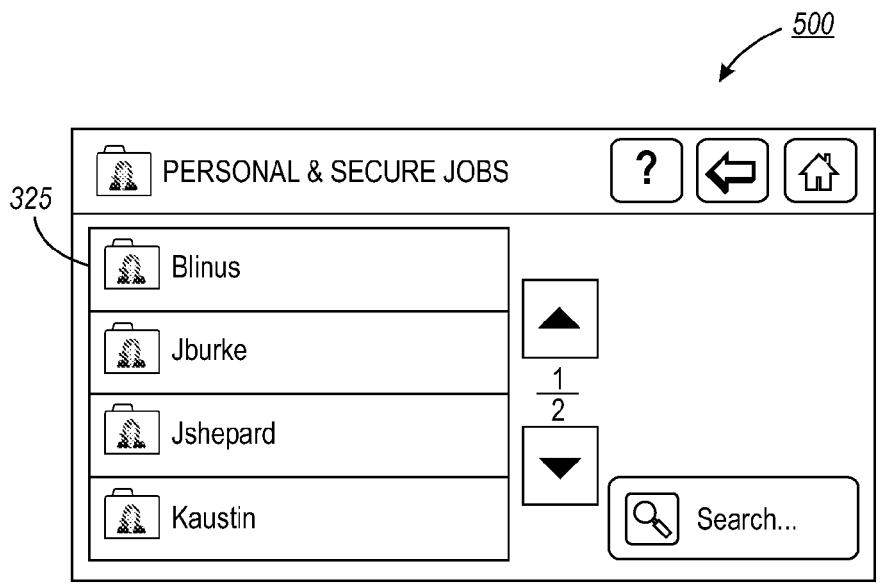
FIG. 5 illustrates a GUI of a user folder selection screen, in accordance with the disclosed embodiments.

FIG. 5 illustrates a GUI of a user selection screen 500, in accordance with the disclosed embodiments. Again as a reminder, note that in FIGS. 1-9, identical or similar parts are generally indicated by identical reference numerals. Note that the GUI 500, 600, 700, 800 and/or 900 can be implemented utilizing a GUI such as, for example, the GUI 125 depicted in FIG. 1 herein, and may be provided by a module, such as, for example, module 245 (i.e., a software application). GUI 500, 600, 700, 800 and/or 900 can be displayed via a display device such as monitor 115 depicted in FIG. 1. In the illustrated figures herein, 500, 600, 700, 800 and/or 900 are generally implemented in the context of a GUI "window". Note that in computing, a GUI window is generally a visual area containing some type of user interface (e.g., GUI 125). Note that user selection screens 500, 600, 700, 800 and 900 can be displayed, for example, on a display screen associated with a rendering device such as, for example, rendering devices 140, 142, 144 or, for example, a local rendering device, such as, for example, the user interface 145 associated with rendering device 140. Such a "window" usually (but not always) possesses a rectangular shape, and displays the output of and may allow input to one or more processes. Such windows are primarily associated with graphical displays, where they can be manipulated with a mouse cursor, such as, for example, the pointing device 130 depicted in FIG. 1. A GUI using windows as one of its main "metaphors" is often referred to as a windowing system.

Figure 6:
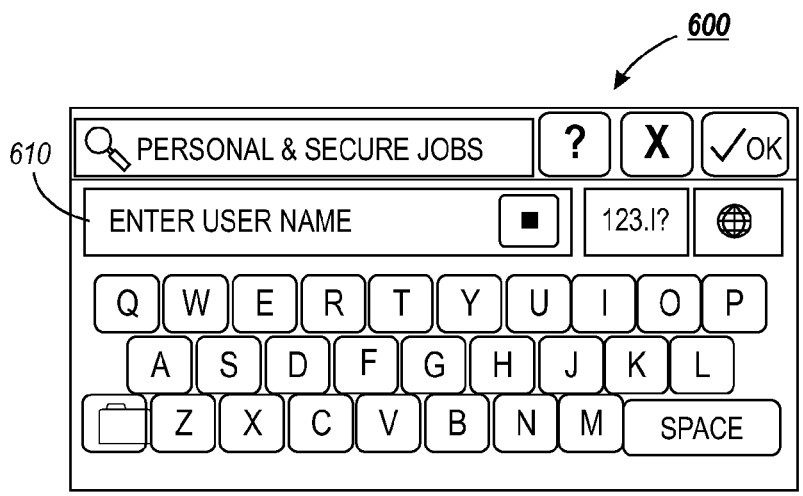
FIG. 6 illustrates a GUI of a search screen, in accordance with the disclosed embodiments.

A list of folders 325 each labeled with the username of the individual who currently have personal or secure jobs awaiting disposition can be displayed to the user. FIG. 6 illustrates a GUI of a search screen 600, in accordance with the disclosed embodiments. The folder associated with the user can be searched by entering a username in a graphically displayed box 610. The user can then select the folder associated with their username. A determination can be made if the folder associated with the user includes a secure rendering job 328, as illustrated at block 425. If the folder does not include the secure job 328 an authentication process can be automatically skipped and the list of personal rendering jobs can be displayed to the user, as indicated at block 430.

If the folder includes the secure and personal rendering jobs 326 and 328 a determination can be made whether the authentication process can be skipped, as illustrated at block 435. If the authentication process is skipped the list of personal rendering jobs and the secure rendering jobs can be displayed to the user, as indicated at block 450. Otherwise, the authentication process can be performed in order to display the list of secure rendering jobs, as indicated at block 440. Note that the authentication process involves a user logon process, during which the user submits secret information such as a network password or personal identification number (PIN). The password can be entered via an alphanumeric keyboard or a keypad for systems that support network-based authentication. Another type of authentication process may involve a smartcard authentication process. However, it will be apparent to those of skill in the art that other cards can be employed as desired without departing from the scope of the invention.

A determination can be made whether the authentication process is successful, as indicated at block 445. If the user enters correct authentication credentials the secure rendering jobs can be displayed to the user, as illustrated at block 450. Otherwise, the user can be prompted to enter the correct network credentials. Thereafter, as illustrated at block 460, the rendering jobs can be selected for release and rendered via the multi-function device 140. An option to delete the selected rendering job can also be provided, as indicated at block 470.

Figure 7:
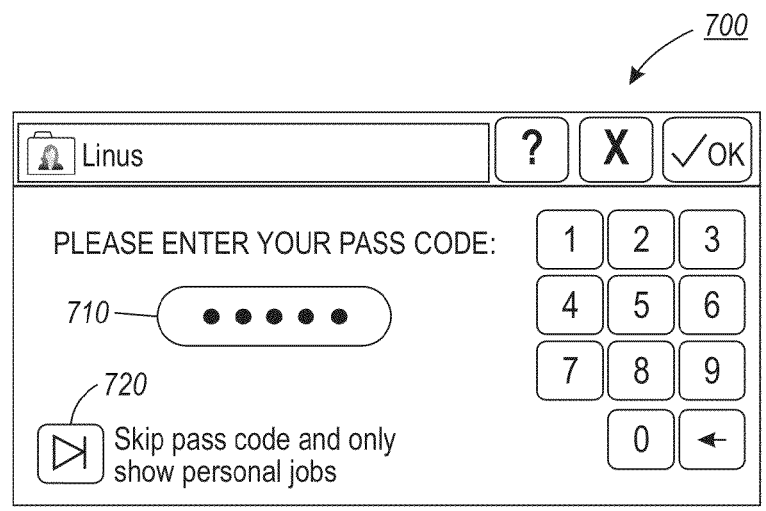
FIG. 7 illustrates a GUI of a user authentication screen, in accordance with the disclosed embodiments.

FIG. 7 illustrates a GUI of a user authentication screen 700, in accordance with the disclosed embodiments. Note that the term interface as utilized herein generally refers to a type of environment that represents programs, files, options and so forth by means of graphically displayed icons, menus, and dialog boxes on a screen. The user can interact with the GUI to select and activate such options by pointing and clicking with a user input device such as, for example, a touch screen, a key board, a mouse, and so forth. A particular item may function in the same manner to the user in all applications because the user interface provides standard software routines to handle these elements and reports the user's actions. The authentication screen 700 includes a graphically displayed box 710 to enter the PIN or pass code. Accessing a graphically displayed button 720 can also skip the authentication process.

Figure 8:
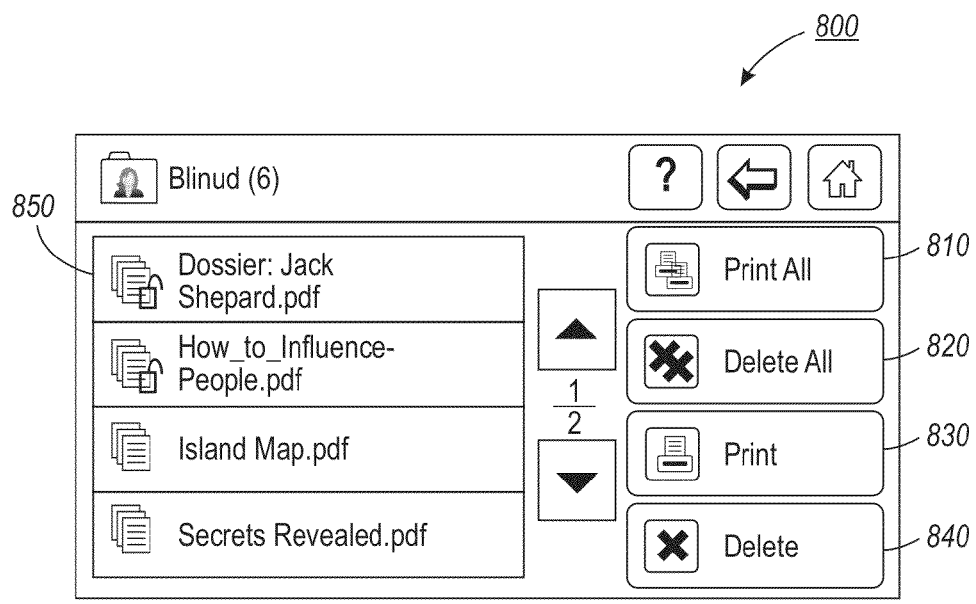
FIG. 8 illustrates GUI of a job selection screen, in accordance with the disclosed embodiments.

FIG. 8 illustrates GUI of a job selection screen 800, in accordance with the disclosed embodiments. The job selection screen 800 displays the list of jobs associated with the user. The personal and the secure rendering jobs can be differentiated visually utilizing dissimilar job icons. For example, the secure rendering job can be provided with an additional lock element 850 having both a locked and an unlocked state. The authentication screen 700 can be provided if the user selects a locked job. If the user enters correct authentication credentials the rendering job can be unlocked. Otherwise the job will remain locked. The rendering job selected by the user can be released or deleted by accessing the icon 830 and 840, respectively. A notification indicative of successful submission of the rendering job can be also provided and the job can be removed from the folder 325. Once all the jobs are removed from the user folder, the folder can be also removed from the list. All the rendering jobs associated with folder 325 can be released or deleted completely by accessing the icon 810 and 820, respectively.

Figure 9:
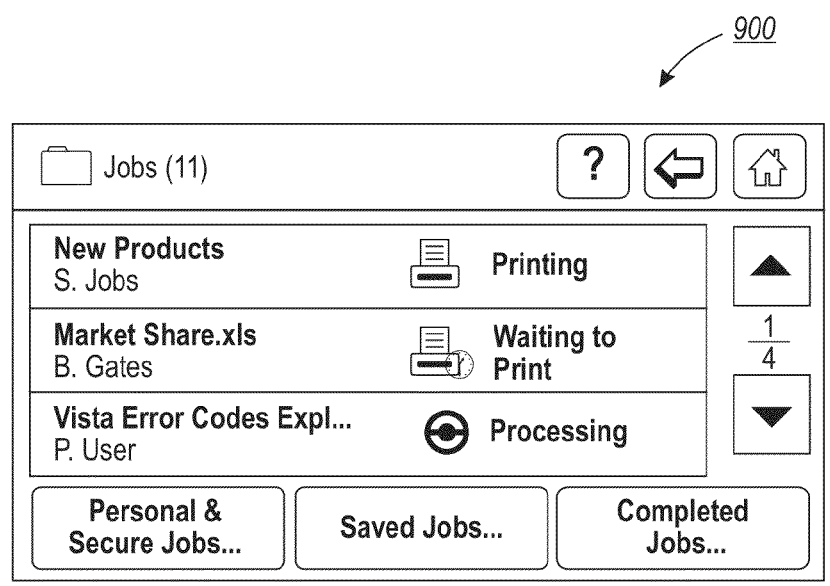
FIG. 9 illustrates a GUI of a job status screen, in accordance with the disclosed embodiments.

FIG. 9 illustrates a GUI of a job status screen 900, in accordance with the disclosed embodiments. The GUI screen 900 displays the status of the personal and the secure rendering jobs 326 and 328 associated with the MFD 140. A generic job identifier can also be employed if there is an issue with displaying the actual names associated with the secure rendering job 328 until the user has completed the authentication process. It is believed that by utilizing the system and approach described herein, the personal and secure rendering jobs can be consolidated and managed such that the user can easily locate, manage, and render the jobs that are associated with the username. Such an approach also provides an appealing and efficient way for the user to manage the personal and secure jobs with respect to the rendering device 140.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for consolidating and managing rendering jobs, said method comprising:
   determining if at least one rendering job is a secure rendering job or is a personal rendering job;
   identifying said at least one rendering job as said secure rendering job or said personal rendering job according to said determining;
   transmitting said at least one rendering job to a multifunction device;
   automatically creating only one folder wherein said folder has no sub-folders, based on a username associated with a user upon receiving said at least one rendering job with respect to said multifunction device in order to thereafter collect subsequent rendering jobs in said one folder;
   selecting said one folder associated with said user from a plurality of folders in order to thereafter consolidate, manage, and render said at least one rendering job associated with said one folder;
   selecting said at least one rendering job associated with said one folder in order to thereafter delete said at least one rendering job; and
   automatically deleting said one folder from said multifunction device once all of said at least one rendering jobs have been removed.

2. The method of claim 1 wherein said at least one rendering job comprises a secure rendering job identified as a secure rendering job by a user.

3. The method of claim 1 wherein said at least one rendering job comprises a personal rendering job identified as a personal rendering job by a user.

4. The method of claim 2 further comprising performing an authentication process if said folder comprises said secure rendering job.

5. The method of claim 2 further comprising automatically skipping said authentication process in order to directly access said folder if said folder does not include said secure rendering job.

6. The method of claim 3 further comprising bypassing said authentication process and only displaying said personal rendering jobs based on a user selection if said folder comprises said personal rendering job and said secure rendering job.

7. The method of claim 1 further comprising displaying a dissimilar job icon in association with said at least one rendering job in order to visually differentiate a personal rendering job from a secure rendering job when said personal rendering job and said secure rendering job are held in said folder associated with a user.

8. The method of claim 2 further comprising providing an additional lock element having a lock state indicated by a lock icon and unlock state indicated by an unlock icon in association with said secure rendering job.

9. The method of claim 4 further comprising configuring a generic job identifier in association with said secure rendering job until completion of said authentication process.

10. The method of claim 1 further comprising providing a notification indicative of successful submission of said at least one rendering job in order to thereafter automatically remove said at least one rendering job from said folder.

11. The method of claim 1 further comprising prompting said user to perform a search operation if said folder associated with said user is not determined.

12. A system for consolidating and managing rendering jobs, said system comprising:
   a data bus coupled to said processor; and
   a computer-usable medium embodying computer code, said computer-usable medium being coupled to said data bus, said computer program code comprising instructions executable by said processor and configured for:
   determining if at least one rendering job is a secure rendering job or is a personal rendering job;
   identifying said at least one rendering job as said secure rendering job or said personal rendering job according to said determining;
   transmitting said at least one rendering job to a multifunction device;
   automatically creating only one folder wherein said folder has no sub-folders, based on a username associated with a user upon receiving said at least one rendering job with respect to said multifunction device in order to thereafter collect subsequent rendering job in said folder;
   selecting said one folder associated with said user from a plurality of folders in order to thereafter, manage, and render said at least one rendering job associated with said one folder;
   selecting said at least one rendering job associated with said one folder in order to thereafter delete said at least one rendering job; and
   automatically deleting said one folder from said multifunction device once all of said at least one rendering jobs have been removed.

13. The system of claim 12 wherein said at least one rendering job comprises a secure rendering job identified as a secure rendering job by a user.

14. The system of claim 12 wherein said at least one rendering job comprises a personal rendering job identified as a personal rendering job by a user.

15. The system of claim 13 wherein said instructions are further configured for performing an authentication process if said folder comprises said secure rendering job.

16. The system of claim 15 wherein said instructions are further configured for automatically skipping said authentication process in order to directly access said folder if said folder does not include said secure rendering job.

17. The system of claim 14 wherein said instructions are further configured for bypassing said authentication process and only displaying said personal rendering jobs based on a user selection if said folder comprises said personal rendering job and said secure rendering job.

18. A system for consolidating and managing rendering jobs, said system comprising:
   a data bus coupled to said processor; and
   a computer-usable medium embodying computer code, said computer-usable medium being coupled to said data bus, said computer program code comprising instructions executable by said processor and configured for:
   determining if at least one rendering job is a secure rendering job or is a personal rendering job;
   identifying said at least one rendering job as said secure rendering job or said personal rendering job according to said determining;
   transmitting said at least one rendering job to a multifunction device;
   automatically creating only one folder wherein said folder has no sub-folders, based on a username associated with a user upon receiving said at least one rendering job with respect to said multifunction device in order to thereafter collect subsequent rendering job in said one folder;

selecting said folder associated with said user from a plurality of folders in order to thereafter consolidate and manage said one folder based on said at least one rendering job;

displaying a dissimilar job icon in association with said at least one rendering job in order to visually differentiate a personal rendering job from a secure rendering job;

selecting said at least one rendering job associated with said one folder in order to thereafter delete said at least one rendering job; and automatically deleting said one folder from said multifunction device once all of said at least one rendering jobs have been removed.

19. The system of claim 18 wherein said instructions are further configured for:

providing an additional lock element having a lock state indicated by a lock icon and unlock state indicated by an unlock icon in association with said secure rendering job; and configuring a generic job identifier in association with said secure rendering job until completion of an authentication process.

20. The system of claim 19 wherein said instructions are further configured for:

providing a notification indicative of successful submission of said at least one rendering job in order to thereafter automatically remove said at least one rendering job from said folder; and prompting said user to perform a search operation if said folder associated with said user is not determined.

* * * * *